United States Patent
Lehenbauer et al.

(10) Patent No.: US 7,952,581 B2
(45) Date of Patent: May 31, 2011

(54) REALISTIC TRANSFORMATION OF 3D LIGHTING MODELS

(75) Inventors: Daniel Lehenbauer, Redmond, WA (US); J. Jordan C. Parker, Redmond, WA (US); Adam Smith, Sammamish, WA (US); Alexander Stevenson, Bellevue, WA (US); Daniel N. Wood, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 11/728,368

(22) Filed: Mar. 26, 2007

(65) Prior Publication Data
US 2008/0238921 A1    Oct. 2, 2008

(51) Int. Cl.
*G06T 15/50* (2006.01)
(52) U.S. Cl. .................................... 345/426; 345/419
(58) Field of Classification Search .................. 345/426
See application file for complete search history.

(56) References Cited

U.S. PATENT DOCUMENTS

| | | | |
|---|---|---|---|
| 4,965,844 A | 10/1990 | Oka et al. | |
| 5,282,262 A | 1/1994 | Kurashige | |
| 5,481,660 A | 1/1996 | Kurashige et al. | |
| 5,577,175 A | 11/1996 | Naka et al. | |
| 5,777,620 A * | 7/1998 | Billyard | 345/426 |
| 6,014,472 A | 1/2000 | Minami et al. | |
| 6,037,947 A * | 3/2000 | Nelson et al. | 345/426 |
| 6,078,332 A | 6/2000 | Ohazama | |
| 6,259,454 B1 | 7/2001 | Swanson et al. | |
| 6,317,126 B1 * | 11/2001 | Tannenbaum | 345/426 |
| 6,567,083 B1 | 5/2003 | Baum et al. | |
| 6,975,755 B1 * | 12/2005 | Baumberg | 382/154 |
| 7,463,261 B1 * | 12/2008 | O'Donnell | 345/427 |

OTHER PUBLICATIONS

Yan, Properties of Determinant: Invertibility and Determinant, http://algebra.math.ust.hk/determinant/03_properties/lecture2.shtml (accessed Apr. 24, 2003 by Internet Archive).*
"Class PointLight", http://java.sun.com/products/java-media/3D/forDevelopers/J3D_1_2_API/j3dapi/javax/media/j3d/PointLight.html, Dec. 2006.
"SceneLight Properties", http://zone.ni.com/reference/en-XX/help/371361B-01/lvprop/scenelight_p/, Dec. 2006.

* cited by examiner

*Primary Examiner* — Xiao M Wu
*Assistant Examiner* — Charles Tseng
(74) *Attorney, Agent, or Firm* — Capitol City TechLaw; Richard C. Irving

(57) ABSTRACT

A lighting model specified in light space may be transformed to a 3D scene, which may include numerous lights. When the lighting model is transformed to the 3D scene and is uniformly scaled or near-uniformly scaled, intensity or brightness of light at sample points, corresponding to points in the 3D scene, may be adjusted proportionately for a light source using a value based, at least partly, on a transform matrix. When the lighting model in the light space is scaled to non-uniformly stretch a lit area, the sample points may be transformed to the light space, using an inverse of a transform matrix. Distances from the light source to the transformed sample points in the light space may be used to determine attenuation and range with respect to the light source.

20 Claims, 4 Drawing Sheets

REALISTIC TRANSFORMATION OF 3D LIGHTING MODELS

BACKGROUND

Retained mode scene graphs typically allow lights to be specified as part of a lighting model to be rendered by a processing device. The lighting model may be transformed and composed into a scene in world space, which is a frame of reference of an entire three dimensional (3D) scene, before the 3D scene may be lit.

Two mathematical lighting models, which traditionally do not behave realistically when transformed, are point light models and spot light models. When these light models are used with models of 3D geometry to represent real-world objects, deficiencies with respect to how these lighting models behave when transforms are applied become very apparent.

For example, assume one has a 3D model of a desk lamp sitting on a table. The lamp includes a point light, which will light an area of the table within a fixed radius of the point light, as well as 3D geometry which represents the physical shape and size of the desk lamp. If the desk lamp model, which includes the light, is transformed such that the model is scaled to be half of its original size, one would expect the lit area of the table beneath the lamp to become proportionately smaller to correspond with the lamp's new size. However, in mathematical lighting models, point lights and spot lights are mathematical approximations of a physical light with a theoretical zero area emitter. Therefore, decreasing a size of a point light or a spot light will not affect a radius of a lit area, since the properties on the light model that affect the brightness and attenuation of the light are not transformed. In fact, in the example of the desk lamp having the point light, the lit area beneath the lamp will actually increase when the size of the lamp decreases because, as the size of the lamp decreases, the point light of the lamp moves closer to a surface of the table.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a lighting model for a processing device may be specified in light space, which is a local coordinate space of light. The lighting model may be transformed from the light space to world space, which is a frame of reference of an entire three dimensional (3D) scene. The lighting model may be transformed to the world space and uniformly scaled by applying a transform matrix, which may correspond to a similarity transform. When a light source in the lighting model includes a point light or a spot light, a brightness or intensity of light, corresponding to sample points in the world space, may be set to a more realistic value by adjusting a property of light, such as, for example, attenuation. In some embodiments, the attenuation may be adjusted by using a value based on the transform matrix.

When a lit area of the lighting model is scaled non-uniformly by applying a transform matrix, a distance may be computed between a sample point and a light source in light space. The computed distance may be used to compute an attenuation of a light and to determine a range of the light with respect to a corresponding point in a 3D scene. For spot lights, rho, which is a cosine of an angle formed by a vector from a point to a light source and a direction vector of the light source, may be determined based on a position of a corresponding sample point in the light space. Rho, in combination with attenuation, range, inner cone angle, outer cone angle, and fall-off determine how a light affects an intensity or brightness of points in the 3D scene in world space.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 a functional block diagram illustrating an exemplary processing device, which may be used in implementations consistent with the subject matter of this disclosure.

DETAILED DESCRIPTION

Figure 1:
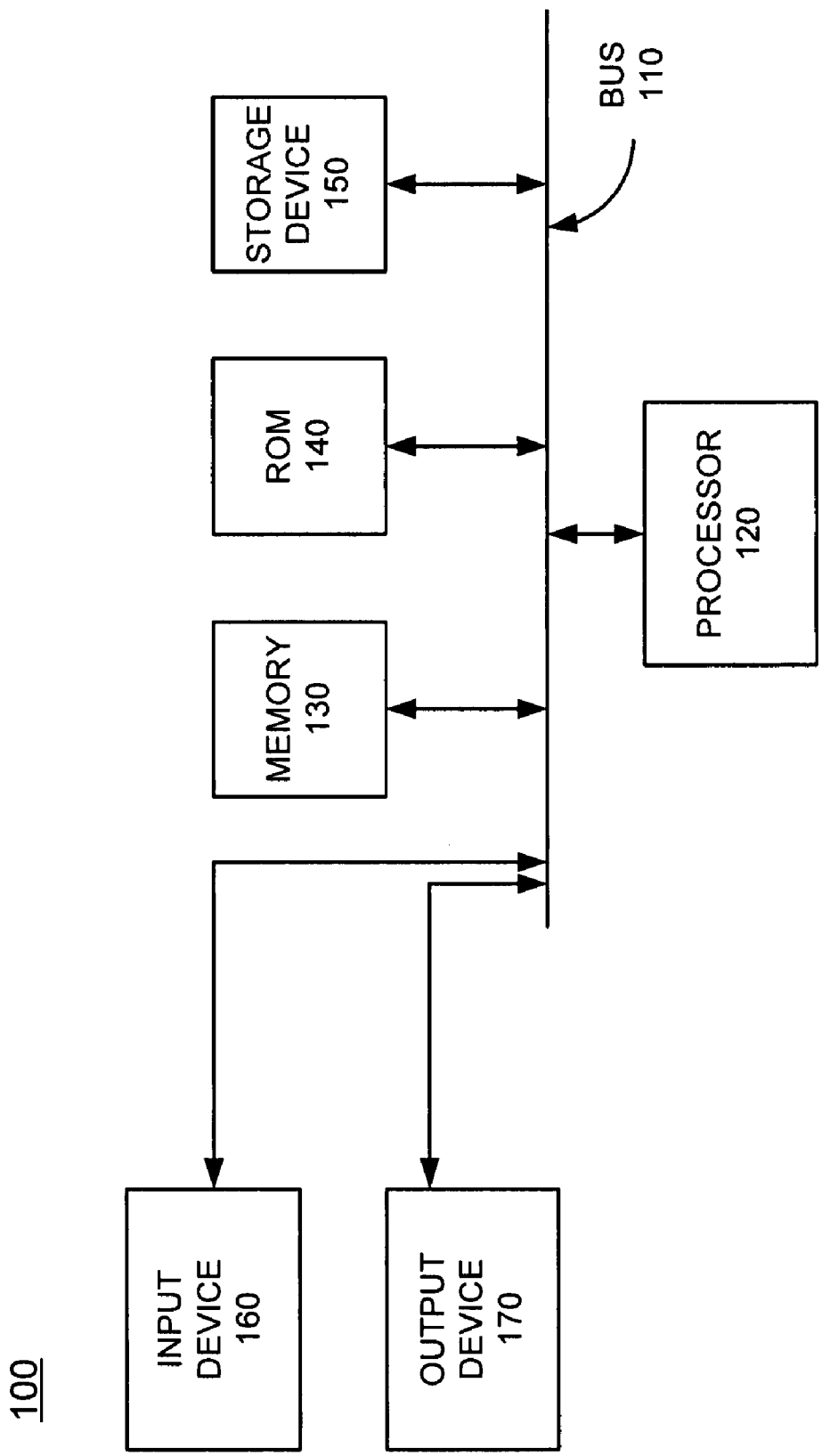

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, properties of light for a lighting model, to be rendered by a processing device, may be specified in "light space". Light space is a local coordinate space of light. In various embodiments, the properties of light may be transformed into "world space" before the 3D scene may be lit. World space is a common frame of reference of an entire three dimensional (3D) scene. The 3D scene may include numerous lights with varying lighting models.

A "similarity" transform may be used to transform a lighting model by performing any or all of a rotation, translation, or uniform scaling of the lighting model. In embodiments in which the lighting model is transformed from light space into world space using a transform matrix, corresponding to a similarity transform, properties of light may be transformed using a value based on the transform matrix. In some embodiments, the transform matrix may be a 4×4 matrix corresponding to the transform between light space and world space.

For example, when the lighting model includes a point light, a brightness of light may be computed for each sample point, such as, for example, vertices corresponding to points on a surface of an object in a 3D scene in the world space. The computed brightness may take into account the properties of light, such as, for example, attenuation and range. In other embodiments, the brightness of the light may be computed for other sample points, such as, for example, for each pixel, or other points. A transform matrix may perform uniform or near-uniform scaling of the lighting model from the light space to the world space. Distances from the light to respective sample points may be adjusted to account for the transform when computing an influence of attenuation. A constant attenuation of light, a quadratic attenuation of light, and range may be declared by the user and may be conceptually fixed. The range of the light may be adjusted by multiplying the range of the light of the lighting model in light space by the value to compensate for the light's transform. Thus, intensity, or brightness of light at sample points corresponding to points on the surface of an object in a 3D scene in world space may be adjusted proportionately for a point light source when performing uniform or near-uniform scaling for transforming a lighting model in light space to a 3D scene in world space.

When the lighting model includes a spot light, the properties of light, such as, for example, attenuation and range, may be computed and adjusted as described above with respect to the point light. Light emitted from the spot light includes a bright inner cone and a darker outer cone. Intensity of the light diminishes between the inner cone and the outer cone. Falloff defines how quickly or slowly the intensity of the light diminishes between an outer edge of the inner cone and an inner edge of the outer cone. Because a shape of the inner cone angle and a shape of the outer cone angle are not affected by uniform scaling or rotations, no computational adjustments may be made with respect to the inner cone angle and the outer cone angle.

Thus, intensity, or brightness of light at sample points corresponding to points on a surface of an object in a 3D scene in world space may be adjusted proportionately for a spot light source when performing uniform or near-uniform scaling for transforming a lighting model in light space to a 3D scene in world space by adjusting the computed attenuation and the range using a value based on the transform matrix used to transform the lighting model to the 3D scene in the world space.

In other embodiments consistent with the subject matter of this disclosure, a non-uniform (or "non-similarity") transform may stretch a lit area from a lighting model. When a light source is a point light, the stretched lit area may resemble an ellipse. When the light source is a spot light, the stretched lit area may resemble an elliptical cone. In one embodiment, the properties of light may be adjusted by computing a distance in the light space from a light source to respective sample points corresponding to points on a surface of an object in the light space and using the computed distance to adjust the attenuation and the range when computing effects of the attenuation and the range on the brightness. The intensity or the brightness of light at sample points corresponding to points on the surface of the object in the world space may be computed based on the adjusted attenuation and the adjusted range to compensate for the light's transform.

For a spot light in a lighting model that is non-uniformly scaled or stretched, in addition to the adjustments made to the attenuation and the range by using the computed distance in the light space from a light source to respective sample points, an adjustment may be made to account for a change of shape to an inner cone angle and an outer cone angle of the spot light. In one embodiment, rho, which is a cosine of an angle formed by a direction vector from a sample point, corresponding to a point on a surface of an object, to a position of a light source, and a direction vector of the spot light, may be determined by computing the direction vector from the sample point to the position of the light source in the light space. Rho, in combination with the inner cone angle, the outer cone angle, falloff, attenuation and range, may be used to determine an intensity or brightness of the light at a sample point.

Exemplary Processing Device

FIG. 1 is a functional block diagram that illustrates an exemplary processing device 100, which may be used to implement embodiments consistent with the subject matter of this disclosure. Processing device 100 may include a bus 110, a processor 120, a memory 130, a read only memory (ROM) 140, a storage device 150, an input device 160, and an output device 170. Bus 110 may permit communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media for storing data and/or instructions.

Input device 160 may include one or more conventional mechanisms that permit a user to input information to processing device 100, such as, for example, a keyboard, a mouse, or other input device. Output device 170 may include one or more conventional mechanisms that output information to the user, including one or more displays, or other output devices.

Processing device 100 may perform such functions in response to processor 120 executing sequences of instructions contained in a tangible machine-readable medium, such as, for example, memory 130, or other medium. Such instructions may be read into memory 130 from another machine-readable medium, such as storage device 150, or from a separate device via a communication interface (not shown).

Exemplary Processing

Figure 2:
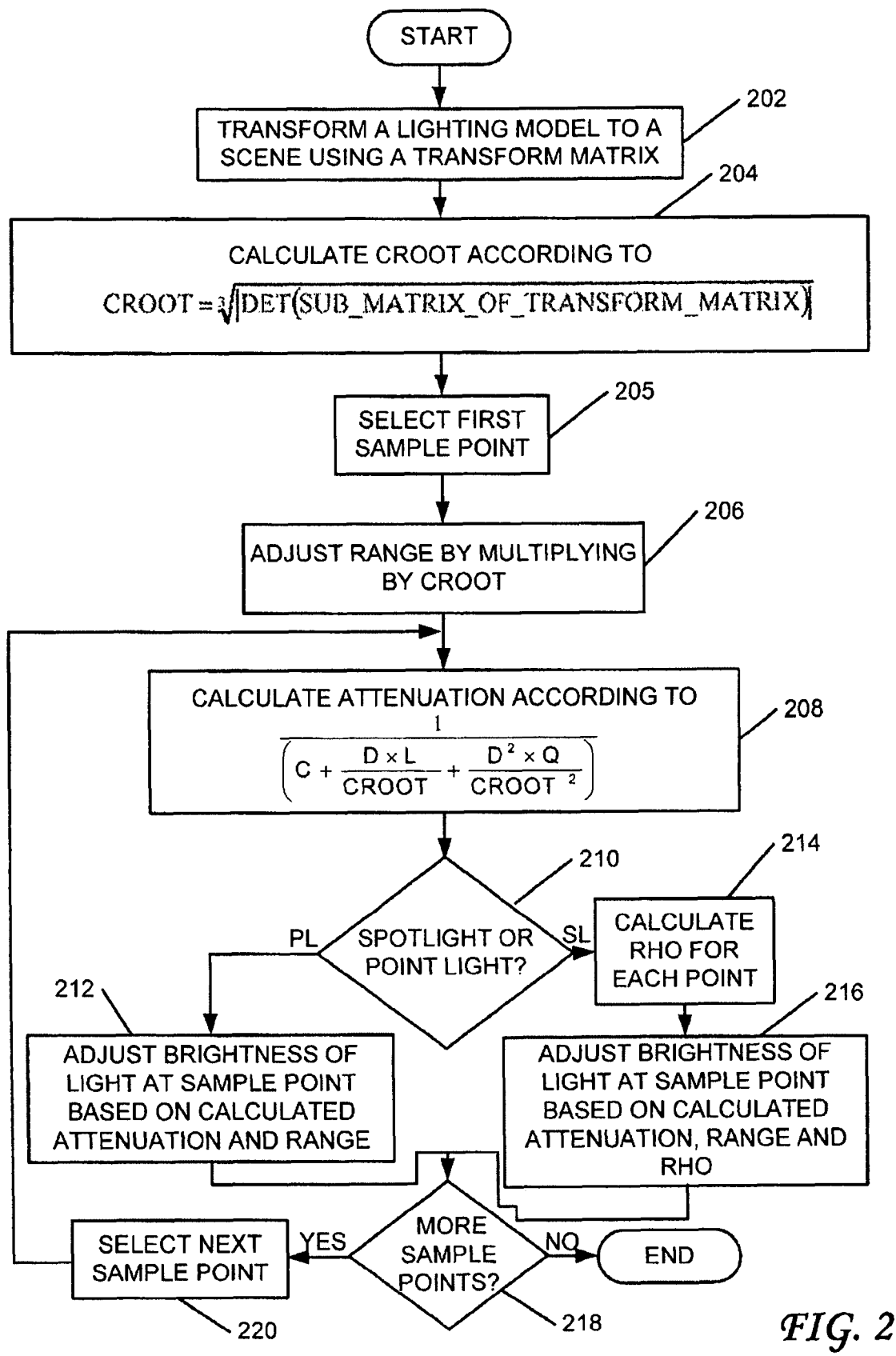
FIG. 2 is a flowchart of an exemplary process for determining a brightness or intensity of light in a three-dimensional scene, when a lighting model is scaled uniformly to the three-dimensional scene.

FIG. 2 is a flowchart of an exemplary process for adjusting properties of a lighting model having a point light or a spot light when the lighting model is scaled uniformly or nearly uniformly. First, a processor, such as, for example, processor 120, may transform a light in light space to a 3D scene in world space using a transform matrix (act 202). The transform matrix may correspond to a similarity transform for performing a rotation, translation, and uniform scaling from the light space to world space. In one embodiment, the transform matrix may be a 4×4 matrix. In other embodiments, a larger transform matrix may be used, which may not be a similarity matrix.

Next, the processor may calculate a value, CROOT, which may be based, at least partially, on the transform matrix. In one embodiment, CROOT may be calculated by the processor by computing the cube root of an absolute value of a determinant of a sub-matrix of the transform matrix (act 204). The sub-matrix of the transform matrix may be a 3×3 matrix in some implementations. In other embodiments, the sub-matrix may be a different size, such as a complete transform matrix.

Next, a first sample point, corresponding to a point on an object in the 3D scene, may be selected (act 205).

The processor then may adjust range of the light, to account for the light's transform, by multiplying the range by the value based, at least partially, on the transform matrix. In one embodiment, the value may be CROOT, as defined above (act 206). Thus, range may be adjusted according to:

$$\text{RANGE} = \text{RANGE} \times \text{CROOT} \quad \text{(Equation 1)}$$

where RANGE is a range, in distance, of the light from the light source.

The processor may then calculate attenuation with respect to the sample point according to:

$$\text{Attenuation} = \frac{1}{\left(C + \frac{D \times L}{CROOT} + \frac{D^2 \times Q}{CROOT^2}\right)} \quad \text{(Equation 2)}$$

where C is a constant attenuation of light from a light source, L is a linear attenuation of the light from the light source, Q is a quadratic attenuation of the light from the light source and D is a distance from a position of the light source to the sample point corresponding to a point on a surface of an object in a 3D scene in the world space (act 208). Essentially, attenuation may be calculated according to:

$$\text{Attenuation} = \frac{1}{(C + D_{ADJ} \times L + D_{ADJ}^2 \times Q)} \quad \text{(Equation 3A)}$$

where $D_{ADJ}$ is the distance from a position of the light source to the sample point, adjusted by dividing the distance by a value based on the transform matrix, such as, for example, CROOT or another value. Alternatively, Equation 3A may be expressed as:

$$\text{Attenuation} = \frac{1}{(C + D \times L_{ADJ} + D^2 \times Q_{ADJ})} \quad \text{(Equation 3B)}$$

where D is the distance from a position of the light source to the sample point, corresponding to a point on a surface of an object in a 3D scene in world space, and $L_{ADJ}$ and $Q_{ADJ}$ are, respectively, the linear attenuation of light for the light source and the quadratic attenuation of light from the light source, adjusted by dividing by the value based on the transform matrix, such as, for example, CROOT or another value.

The processor may then determine whether the light source is a point light or a spot light (act 210). If the light source is a point light, then the processor may calculate and adjust a brightness or intensity of the light at the sample point corresponding to the point on the surface of the object in the 3D scene in the world space, based on the calculated and adjusted attenuation and the adjusted range (act 212).

If, at act 210, the processor determines that the light source is a spot light, then the processor may calculate rho for the sample point corresponding to the point on the surface of the object in the 3D scene in the world space. In this embodiment, rho may be a cosine of an angle formed by a direction vector from a sample point corresponding to a point on a surface of an object in the 3D scene in the world space, to a position of the light source, and a direction vector of the spot light (act 214). Rho may be used to determine an influence of falloff on brightness, taking into account an inner cone angle and an outer cone angle of the spot light. Brightness or intensity of light at the sample point, corresponding to the point on the surface of the object in the 3D scene in the world space, may then be calculated and adjusted based on the calculated and adjusted attenuation, the adjusted range, rho, the inner cone angle, the outer cone angle, and falloff (act 216).

The processor may then determine whether brightness for additional sample points may be adjusted (act 218). If there are additional sample points, then the processor may select a next sample point, corresponding to a next point on the surface of the object in the 3D scene (act 220). The processor then may repeat acts 208-220 until brightness for all sample points has been adjusted.

Figure 3A:
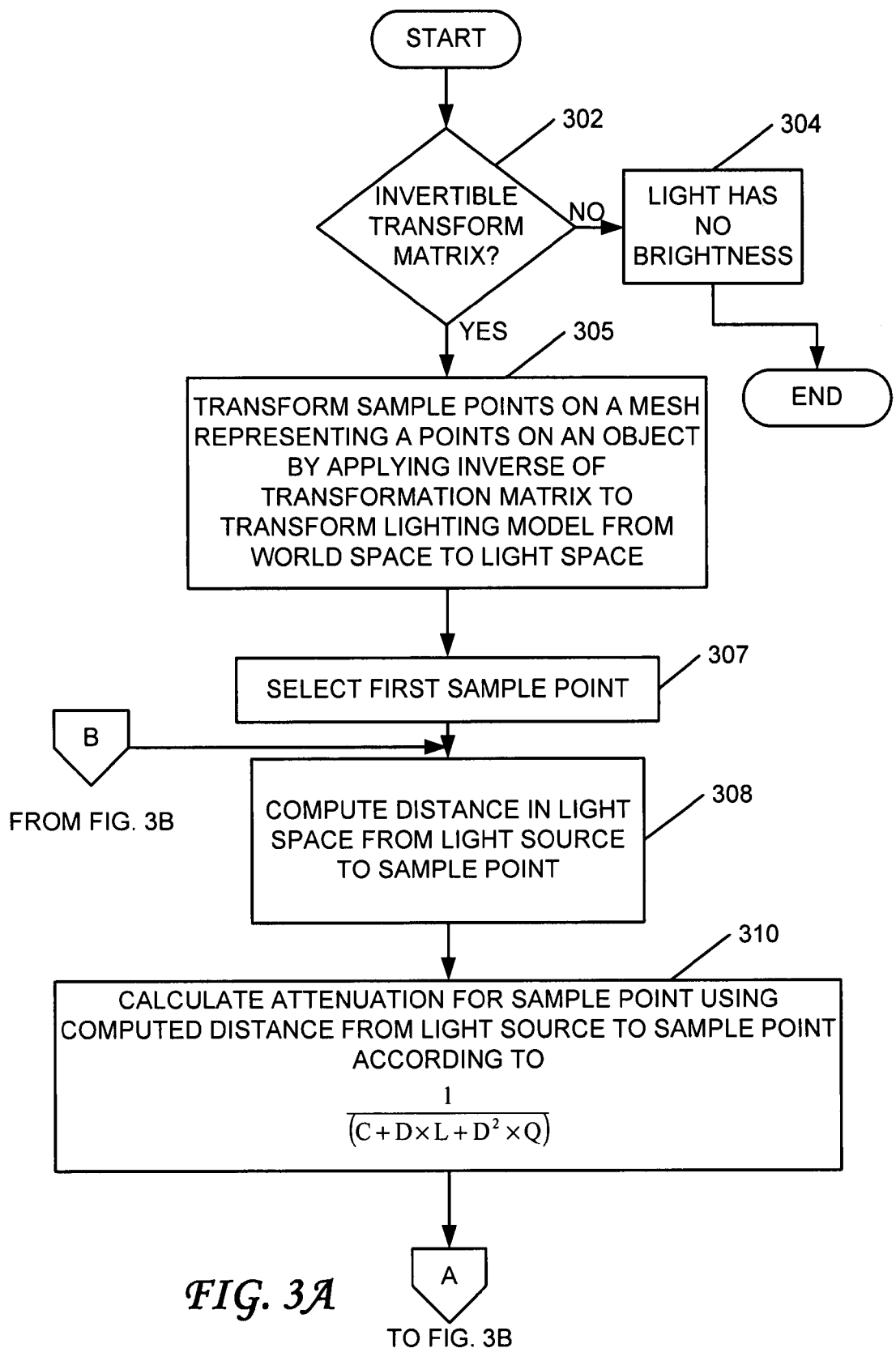
FIGS. 3A-3B are flowcharts of an exemplary process for determining a brightness or intensity of light in a three-dimensional scene, when the lighting model is scaled non-uniformly to the three-dimensional scene.
Figure 3B:
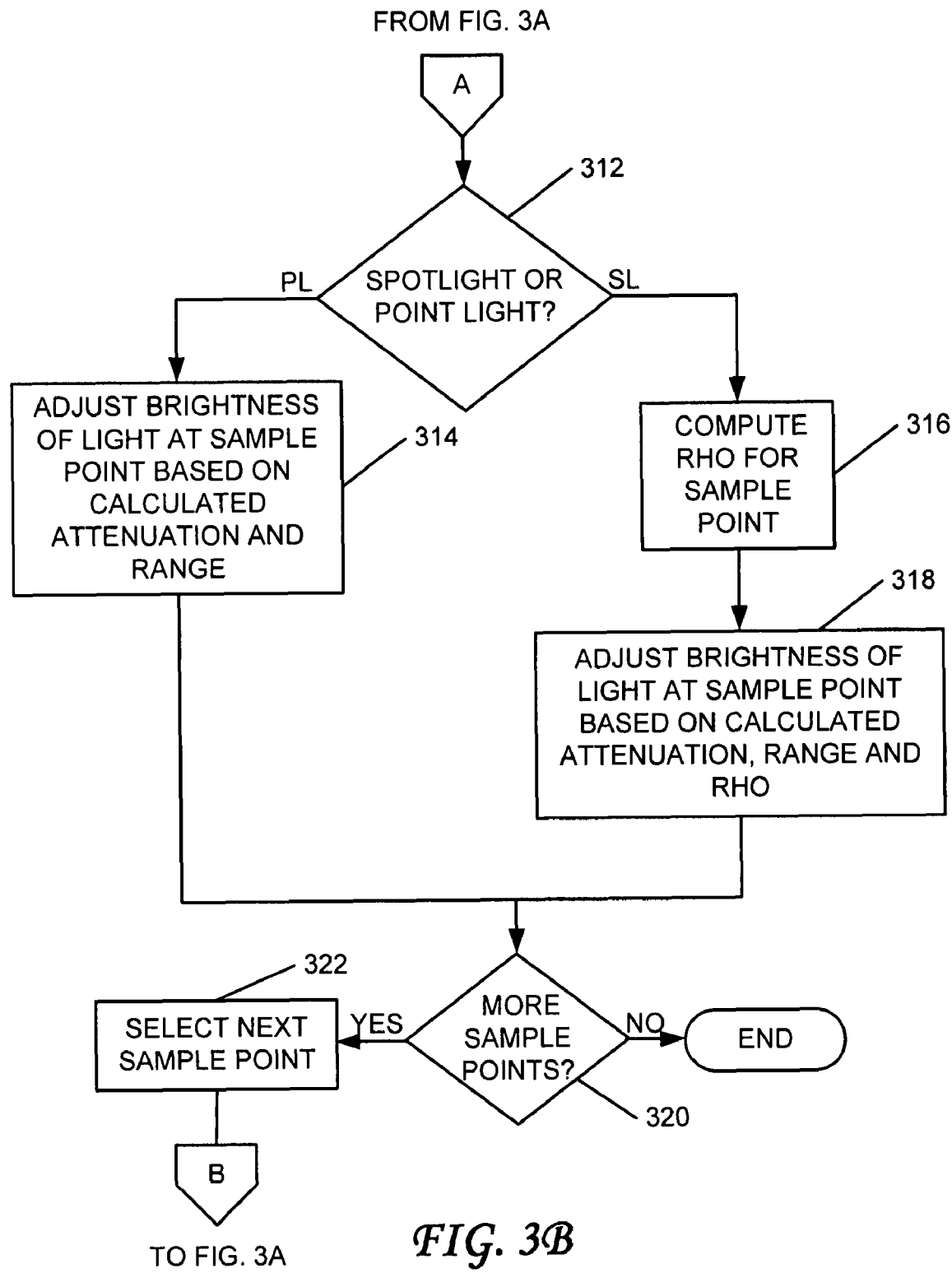

FIGS. 3A-3B illustrate a flowchart of an exemplary process, which may be performed in embodiments consistent with the subject matter of this disclosure, to adjust brightness or intensity of light in a 3D scene in world space when the light is scaled non-uniformly (that is, by a non-similarity transform) to stretch a lit area in the 3D scene in the world space. The process may begin with a processor of a processing device, such as, for example, processor 120, determining whether a transform matrix, for non-uniformly scaling the light from light space to world space to stretch the lit area, is invertible (act 302). If the transform matrix is not invertible (i.e., a determinant of the transform matrix is 0), then this is an indication that light has been flattened and has no volume. Thus, the processing device may set brightness or intensity of the light to a value indicating an absence of light (act 304).

If the processor determines that the transform matrix is invertible, then the processor may transform sample points on a mesh, representing points on an object in the 3D scene in the world space, from the world space to light space (act 305).

Next, the processor may select a first sample point (act 307). The processor may compute a distance from the light source to the sample point in the light space (act 308).

The processing device then may calculate attenuation with respect to the sample point, corresponding to a point on the surface of the object in the world space, using the distance computed in the light space (act 310). In one embodiment, attenuation may be calculated according to:

$$\text{ATTENUATION} = \frac{1}{(C + D \times L + D^2 \times Q)} \quad \text{(Equation 4)}$$

where C is a constant attenuation of light from the light source, L is a linear attenuation of the light from the light source, Q is a quadratic attenuation of the light from the light source, and D is the computed distance from a position of the light source to a point on a surface of an object in the light space.

The processor may then determine whether the light source is a spot light or a point light (act 312; FIG. 3B). If the light source is a point light, then brightness or intensity of the light at the sample point, corresponding to a point on a surface of an object in a 3D scene, may be computed using the distance computed in the light space to compute the attenuation and determine whether the sample point is within a range of the light (act 314). For example, attenuation may be computed using Equation 4 and the computed distance in the light space may be used to determine whether the sample point is within range of the light source. The brightness or intensity of light at the sample point may be based on the computed attenuation and the range.

If, at act 312, the processor determines that the light source is a spot light, rho may be computed for the sample point corresponding to a point on a surface of an object in a 3D scene in the world space (act 316). As mentioned previously, rho may be used to determine an amount of falloff, taking into account an inner cone angle and an outer cone angle of the spot light. With respect to the exemplary process of FIGS. 3A-3B, rho may be a cosine of an angle formed by a direction vector from a vertex in the light space, corresponding to a point on the surface of an object, to a position of the light source, and a direction vector of the spot light. Rho may be used to determine an intensity or brightness of the light at the sample point in combination with the inner cone angle, the outer cone angle, falloff, as well as attenuation and range (act 318). Attenuation may be computed using the computed distances from the light space, as described above with respect to the point light source. Whether a particular sample point is within the range of the light from the light source may be determined by the computed distance in the light space with respect to the particular sample point.

Miscellaneous

The flowcharts of FIGS. 2-3B illustrate exemplary processes which may be implemented in embodiments consistent with the subject matter of this disclosure. The flowcharts illustrate exemplary processes for adjusting a brightness of light, from a single light source, at sample points corresponding to points on a surface of an object in a 3D scene in world space. When the 3D scene is illuminated by multiple light sources, a brightness of each of the sample points may be adjusted based on light from each of the multiple light sources.

Variations of the processes may be implemented in different embodiments. For example, embodiments described above employ the exemplary process of FIGS. 3A-3B to determine intensity or brightness of light when a lit area is scaled non-uniformly. In other embodiments, the exemplary process of FIGS. 3A-3B may be employed to determine intensity or brightness of light when a lit area is scaled either uniformly or non-uniformly. Further, in some embodiments, the processes of FIGS. 2 through 3B may be combined, such that the exemplary process of FIG. 2 may be used when light is scaled uniformly and the exemplary process of FIGS. 3A and 3B may be used when light is scaled non-uniformly.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than shown. Accordingly, the appended claims and their legal equivalents should only define the invention, rather than any specific examples given.

The invention claimed is:

1. A machine-implemented method for accounting for an effect of scaling on properties of light in a lighting model, the machine-implemented method comprising:
transforming sample points of the lighting model, the transforming including uniformly changing a scale of the lighting model to produce a uniformly scaled lighting model; and
computing an attenuation of light from a light source at a plurality of sample points corresponding to points on a surface of an object in the uniformly scaled lighting model according to $$\frac{1}{\left(C + \frac{D \times L}{X} + \frac{D^2 \times Q}{X}\right)},$$

where C is a constant attenuation of the light from the light source, L is a linear attenuation of the light from the light source, Q is a quadratic attenuation of the light from the light source, D is a distance from the light source to a sample point on a surface of an object, and X is a value based on a transform matrix for uniformly changing the scale of the lighting model, wherein
the machine-implemented method is performed by a processing device.

2. The machine-implemented method of claim 1, further comprising:
adjusting a range of the light based, at least partly, on the value of X.

3. The machine-implemented method of claim 1, wherein the value of X is based on a cube root of a determinant of a sub-matrix of the transform matrix.

4. The machine-implemented method of claim 1, wherein a transform of a transform matrix used to change the scale of the lighting model is a similarity transform.

5. The machine-implemented method of claim 1, further comprising:
adjusting a range of the light
by a formula according to
RANGE$_{ADJ}$=RANGE×CROOT, where RANGE$_{ADJ}$ is the adjusted range of the light, RANGE is the range of the light to be adjusted, and CROOT is a cube root of an absolute value of a determinant of a sub-matrix of a transform matrix used to transform the sample points of the lighting model to produce the uniformly scaled lighting model.

6. The machine-implemented method of claim 1, wherein:
the lighting model includes a spot light; and
an inner cone angle and an outer cone angle of the spot light remain unchanged when the scale of the lighting model is changed.

7. A processing device comprising:
at least one processor;
a memory including instructions for the at least one processor; and
a bus to provide communications between the at least one processor and the memory, the memory further comprising:
instructions for computing distances from sample points, corresponding to points on an object in a uniformly scaled lighting model of a scene, to a light source, and
instructions for computing an attenuation of light from the light source at the sample points on the object in the uniformly scaled lighting model of the scene according to $$\frac{1}{\left(C + \frac{D \times L}{X} + \frac{D^2 \times Q}{X}\right)},$$

where C is a constant attenuation of the light from the light source, L is a linear attenuation of the light from the light source, Q is a quadratic attenuation of the light from the light source, D is the computed distance from the light source to a sample point on a surface of the object, and X is a value based on a transform matrix for uniformly changing the scale of the lighting model of the scene, instructions for adjusting a range of the light from the light source at the sample points on the object in the uniformly scaled lighting model of the scene by a formula according to $RANGE_{ADJ} = RANGE \times X$, where $RANGE_{ADJ}$ is the adjusted range of the light.

8. The processing device of claim 7, wherein the light source includes a light selected from a group consisting of a point light and a spot light.

9. The processing device of claim 7, wherein the value X is a cube root of an absolute value of a determinant of at least a sub-matrix of the transform matrix.

10. The processing device of claim 7, wherein the value X is based on a sub-matrix of the transform matrix.

11. The processing device of claim 7, wherein:
the light source includes a spot light, and
an inner cone angle and an outer cone angle of the spot light remain unchanged from a lighting model of the scene to the uniformly scaled lighting model of the scene.

12. The processing device of claim 7, wherein
the light source is a spot light, and
the memory further comprises:
instructions for computing a brightness of the light at the plurality of sample points based on the computed attenuation of the light from the spot light at the plurality of sample points, the adjusted range of the light from the spot light, an inner cone angle of the spot light, and an outer cone angle of the spot light.

13. A non-transitory machine-readable storage medium having recorded thereon instructions for at least one processor, the non-transitory machine-readable storage medium comprising:
instructions for uniformly scaling a lighting model scene, illuminated by a light source;
instructions for computing attenuation of light from the light source at a plurality of sample points corresponding to points on a surface of an object included in the uniformly scaled lighting model scene according to $$\frac{1}{C + \frac{D \times L}{X} + \frac{(D \wedge 2) \times Q}{X}},$$

where C is a constant attenuation of the light from the light source, L is a linear attenuation of the light from the light source, Q is a quadratic attenuation of the light from the light source, D is a distance from the light source to a sample point on a surface of an object, and X is a value based on a transformation matrix for uniformly scaling the scene.

14. The non-transitory machine-readable storage medium of claim 13, wherein the light source includes a point light or a spot light.

15. The non-transitory machine-readable storage medium of claim 13, wherein the value X, based on the transform matrix for uniformly scaling the scene, is a cube root of an absolute value of a determinant of at least a sub-matrix of the transform matrix.

16. The non-transitory machine-readable storage medium of claim 13, wherein
the value X based on the transform matrix for uniformly scaling the light model scene is a cube root of an absolute value of a determinant of at least a sub-matrix of the transform matrix, and
the non-transitory machine-readable storage medium further comprises instructions for adjusting a range of the light from the light source by multiplying the range by the value X.

17. The non-transitory machine-readable storage medium of claim 13, further comprising: instructions for adjusting a range of the light from the light source by multiplying the range by the value X.

18. The non-transitory machine-readable storage medium of claim 13, further comprising: instructions for adjusting a range of the light from the light source by multiplying the range by the value X, wherein the value X is based on at least a sub-matrix of the transform matrix.

19. The non-transitory machine-readable storage medium of claim 13, wherein: the light source includes a spot light, and an inner cone angle and an outer cone angle of the spot light remain unchanged when the lighting model scene is uniformly scaled.

20. The non-transitory machine-readable storage medium of claim 13, wherein:
the light source includes a spot light, and
the value X is a cube root of absolute value of a determinant of at least a sub-matrix of the transform matrix, and
the non-transitory machine-readable storage medium further comprises:
instructions for adjusting a range of the light from the light source by multiplying the range by the value X; and
instructions for computing a brightness of the light at the plurality of sample points based on the computed attenuation of the light from the spot light at the plurality of sample points, the adjusted range of the light from the spot light, an inner cone angle of the spot light, and an outer cone angle of the spot light.

* * * * *